United States Patent
Vishal

(10) Patent No.: US 9,444,629 B2
(45) Date of Patent: Sep. 13, 2016

(54) DUAL LAYER TRANSPORT SECURITY CONFIGURATION

(71) Applicant: Vivek Vishal, Jamshedpur/Jharkhand (IN)

(72) Inventor: Vivek Vishal, Jamshedpur/Jharkhand (IN)

(73) Assignee: SAP SE, Walldorf (DE)

( * ) Notice: Subject to any disclaimer, the term of this patent is extended or adjusted under 35 U.S.C. 154(b) by 80 days.

(21) Appl. No.: 13/902,442

(22) Filed: May 24, 2013

(65) Prior Publication Data

US 2014/0351577 A1   Nov. 27, 2014

(51) Int. Cl.
*H04L 29/06*   (2006.01)
*H04L 9/32*   (2006.01)

(52) U.S. Cl.
CPC ........... *H04L 9/3263* (2013.01); *H04L 9/3226* (2013.01); *H04L 63/083* (2013.01); *H04L 63/0823* (2013.01)

(58) Field of Classification Search
CPC ..... H04L 63/16; H04L 9/3263; G06F 21/44; G06F 21/445; H04W 12/06
USPC ........................................................ 713/165
See application file for complete search history.

(56) References Cited

U.S. PATENT DOCUMENTS

| | | | |
|---|---|---|---|
| 6,324,648 B1 | 11/2001 | Grantges, Jr. | |
| 7,269,732 B2 | 9/2007 | Kilian-Kehr | |
| 7,451,308 B2 | 11/2008 | Karabulut | |
| 7,661,131 B1 | 2/2010 | Shaw et al. | |
| 7,770,011 B2 | 8/2010 | Gupta | |
| 7,770,012 B2 | 8/2010 | Gupta | |
| 7,900,240 B2 | 3/2011 | Terzis et al. | |
| 8,181,262 B2 | 5/2012 | Cooper et al. | |
| 8,225,096 B2 | 7/2012 | Miyamoto et al. | |
| 8,346,929 B1 | 1/2013 | Lai | |
| 8,429,734 B2 | 4/2013 | Agbabian et al. | |
| 2006/0173793 A1* | 8/2006 | Glass | G06F 17/30867 705/75 |
| 2012/0260330 A1 | 10/2012 | Zlatarev et al. | |
| 2012/0290833 A1 | 11/2012 | Clegg et al. | |
| 2013/0246280 A1* | 9/2013 | Kirsch | 705/71 |

(Continued)

FOREIGN PATENT DOCUMENTS

EP   1601153 A2   11/2005

OTHER PUBLICATIONS

Sathyan, Jithesh, et al., "Multi-Layered Collaborative Approach to Address Enterprise Mobile Security Challenges", Advances in E-Activities, Information Security and Privacy, (2010), 47-52.

(Continued)

*Primary Examiner* — Harunur Rashid
(74) *Attorney, Agent, or Firm* — Schwegman Lundberg & Woessner, P.A.

(57) ABSTRACT

A system includes a first computer processor that receives a data transmission from a second computer processor. The data transmission includes a client certificate authentication and a user-based authentication. If the incoming information cannot be authenticated by the client certificate in a first layer of the system landscape, then there is no further data transmission to a second layer. If the first layer can authenticate the client certificate authentication, the system landscape transmits the data transmission to the second layer. If the second layer cannot authenticate the user-based authentication, the system prevents the data transmission from being processed at the second layer. If the second layer can authenticate the user-based authentication, the system processes the data transmission at the second layer.

10 Claims, 3 Drawing Sheets

(56) References Cited

U.S. PATENT DOCUMENTS

2014/0047510 A1* 2/2014 Belton et al. ............... 726/4
2014/0096207 A1* 4/2014 Gilbert et al. ............... 726/5

OTHER PUBLICATIONS

U.S. Appl. No. 15/066,349, Preliminary Amendment filed Mar. 11, 2016, 7 pgs.

* cited by examiner

DUAL LAYER TRANSPORT SECURITY CONFIGURATION

TECHNICAL FIELD

The present disclosure relates to a system and method for a dual layer transport security configuration.

BACKGROUND

Security configurations between computer systems, such as a between a server and a client, generally use Hypertext Transport Protocol Secure (HTTPS) and Secure Sockets Layer (SSL) authentication. These authentications use either a client certificate authentication or a basic authentication as are supported by standard security structures. While such authentication is secure, the structures involved in the authentication do not offer multiple layers of security, especially during critical information transmission. In such situations, integrating parties may also feel the need to consider additional security software, hardware, and/or configurations to ensure the integrity of the critical information and ensure protection from hackers.

DETAILED DESCRIPTION

Figure 1:
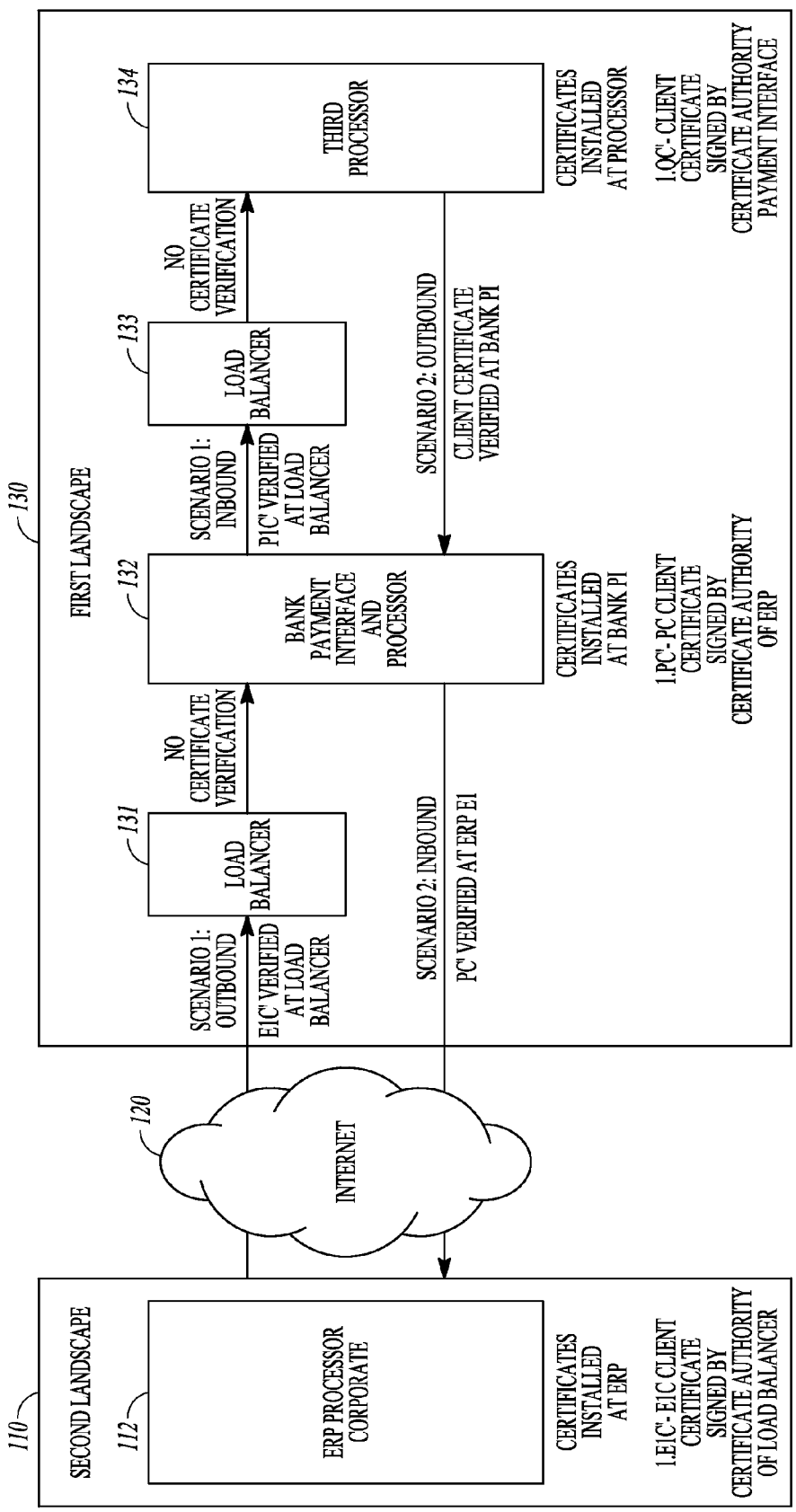
FIG. 1 is a block diagram illustrating an example embodiment of a dual layer transport security configuration.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

An embodiment relates to securing data transmissions through multiple layers of a computer system landscape. The multiple layers of security ensure that in the event of a single party being blocked from sending a message to another party, the message can be rejected at a basic network layer rather than being rejected further into the landscape at an application layer or application program interface (API) layer. This configuration reduces the network traffic entering an application on multiple levels during a scenario.

An embodiment includes the general security concept of HTTPS SSL authentication between a server and a client or any two computer processors or systems. The authentication uses a client certificate authentication and a basic authentication. The dual-layered security structure (i.e., client certificate authentication and basic authentication) verifies first on the basis of a client certificate from a second system and the network layer of a first system, and then moving forward, on the basis of a basic authentication (or individual user-based authentication) at the application layer of the first system. This embodiment is a collaboration of these individual security concepts on the transport layers for communication across different integrated landscapes using the above mentioned systems, protocols, and security structure.

An embodiment provides additional leverage to any business organization to secure its computer system landscape on multiple layers, during multiple periods, on multiple devices, and on multiple systems of any communication during any outbound or inbound scenarios. The multiple-layer security configuration not only strengthens the security domain of any organization, but also provides the feasibility to incorporate the security structure at multiple network components at the same time, which makes this embodiment robust and secure, especially for transmission of confidential data such as banking payment information data. The embodiment also leverages incorrect information by rejecting the incorrect information after being checked at a basic network landscape level, and not checking or re-checking this incorrect information deeper into the landscape at the application level. This technique reduces application layer network traffic and makes the embodiment much more stable, robust and concrete.

Figure 2A:
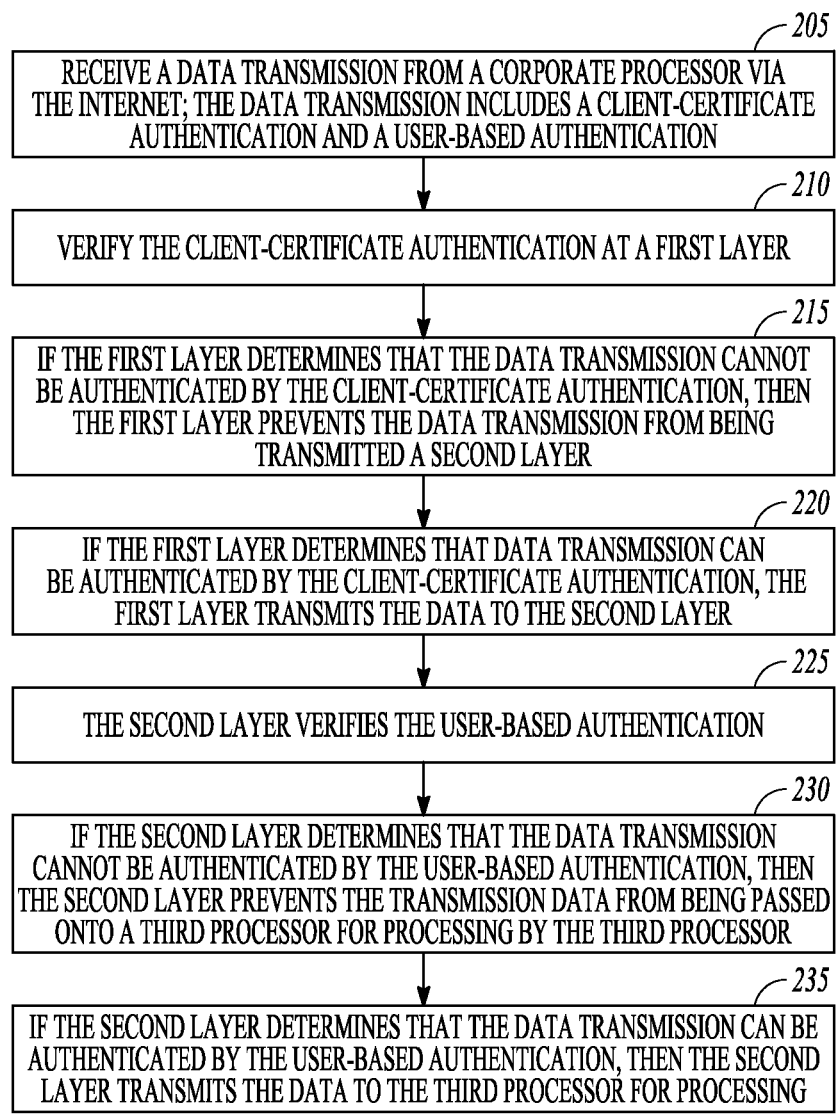
FIGS. 2A and 2B are block diagrams illustrating steps and features of an example embodiment of a dual layer transport security configuration.

FIG. 1 is a block diagram illustrating an example embodiment of a dual layer transport security configuration. The configuration of FIG. 1 includes a first landscape 130 and a second landscape 110 connected by a data transmission network such as the Internet 120. In an embodiment, the second landscape 110 can be that of a business organization and the first landscape 130 can be that of a software vendor and/or a bank or financial institution. A load balancer network device 131 receives a data transmission from a corporate processor 112 via the Internet 120. (FIG. 2A, No. 205). The data transmission from the corporate processor 112 includes a client certificate authentication and a user-based authentication. The load balancer 131 verifies the client certificate authentication (210). This client certificate authentication by the load balancer 131 occurs at a first layer of the computer landscape. This first layer of the computer landscape can be referred to as the network layer of the computer landscape.

If the first layer load balancer 131 determines that the data transmission cannot be authenticated by the client certificate authentication, then the load balancer 131 prevents the data transmission from being transmitted to the first computer processor on the application layer via the bank payment interface 132 (215). However, if the first load balancer 131 determines that the data transmission can be authenticated by the client certificate authentication, the first load balancer 131 transmits the data through the bank payment interface 132 to the application layer of the first computer processor (220).

The data from the first computer processor is transmitted to the network layer of the third computer processor 134. The incoming data is verified at the second load balancer 133 using the client certificate authentication. If the second load balancer 133 determines the data transmission cannot be authenticated by the client certificate (230), then the load balancer 133 prevents the data transmission to the third computer processor. If the second load balancer 133 authenticates the client certificate, then the second load balancer 133 transmits the data to the application layer of the third computer processor. If the third computer processor 134 verifies the basic authentication (225, 235), the information that was originally sent from the second computer processor is processed by the third computer processor 134.

There are several advantages to the dual layer transport configuration of FIG. 1. First, as noted above, the system of FIG. 1 can block traffic at the network layer and reduce network traffic that enters into the application layer. Second, the configuration decreases the load on the first computer processor and results in an improved performance of message communication and processing. This improved performance is evident especially in connection with large messages in the first computer processor and the data transmission. In the event of a party representing the second computer processor being blocked from data transmission to the first computer processor, instead of rejection at the API layer where data may be processed for further communication, it can be rejected at the network layer. Third, a business process may not need any additional infrastructure/application to enhance the security of this process in agreement with the criticality to the information flow.

Figure 2B:
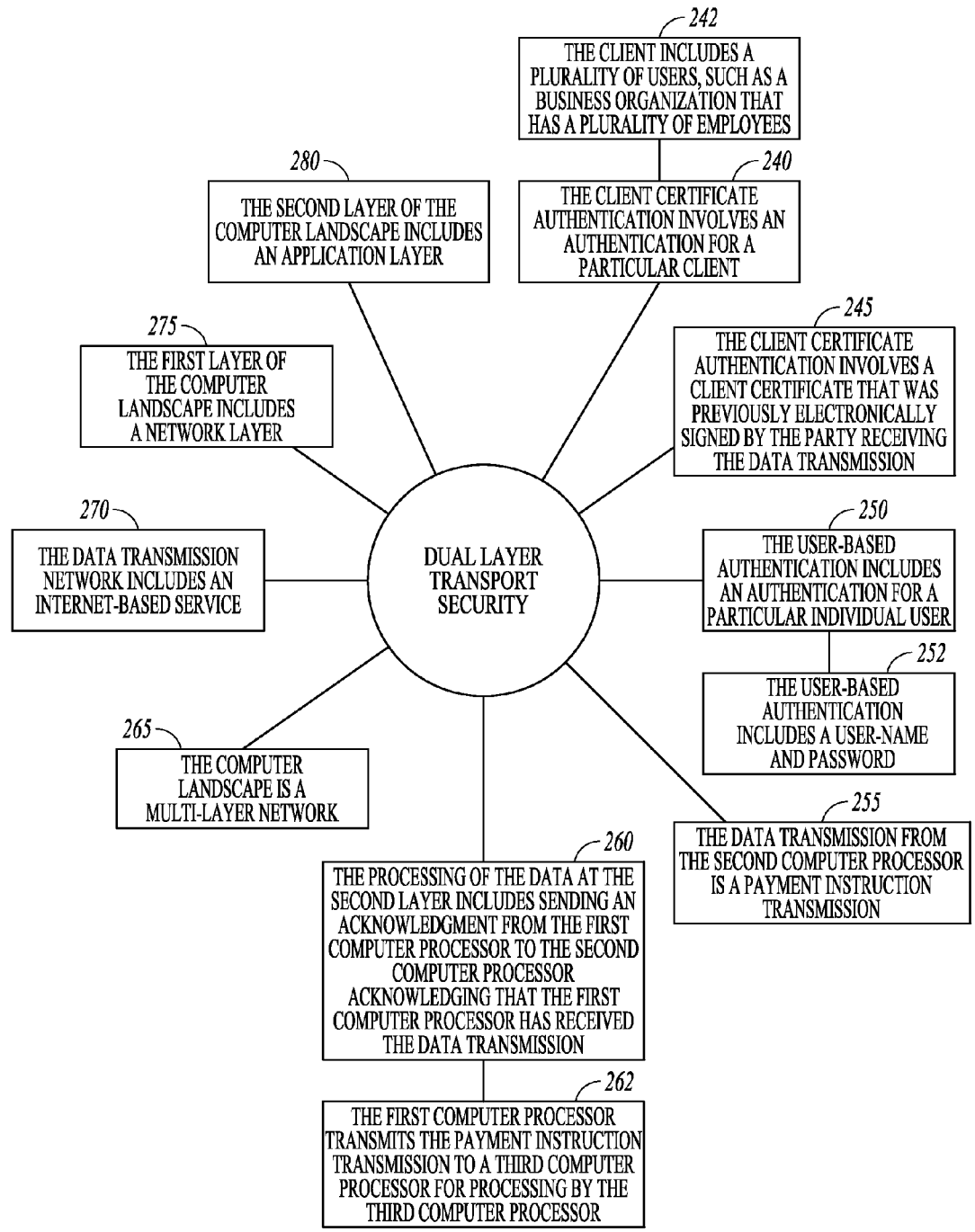

Referring to FIG. 2B, details of the client certificate authentication are as follows. The client certificate authentication involves an authentication for a particular client (240). In most cases, this involves a client certificate that was previously electronically signed by the party receiving the data transmission (245). The party receiving this transmission then knows via the previously signed certificate that the data transmission is from the particular client and is therefore authentic. The client normally includes a plurality of users, such as a business organization that has a plurality of employees (242).

FIG. 2B illustrates that the user-based authentication can include an authentication for a particular individual user (250). The particular individual user is normally associated with a particular client. As noted at 252, the user-based authentication can include a user-name and password.

As illustrated at 255, the data transmission from the second computer processor can be a payment instruction transmission.

At 260, the processing of the data at the second layer includes sending an acknowledgment from the first computer processor to the second computer processor acknowledging that the first computer processor has received the data transmission. In certain system embodiments, as indicated at 262, a third computer processor is present, and the first computer processor transmits the payment instruction transmission to the third computer processor for processing by the third computer processor.

Other features of an embodiment of a dual layer transport security configuration include a computer landscape that is a multi-layer network (265), a data transmission network that includes an Internet-based service (270), a first layer of the computer landscape that includes a network layer (275), and a second layer of the computer landscape that includes an application layer (280).

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

The invention claimed is:

1. A system comprising:
a first computer processor in a computer landscape performing the following operations:
receive a data transmission from a second computer processor via a data transmission network, wherein the data transmission comprises a client certificate authentication and a user-based authentication;
verify, at a first layer of the computer landscape, the client certificate authentication, wherein the first layer of the computer landscape comprises a network layer;
in response to determining at the first layer that the data transmission cannot be authenticated by the client certificate authentication, prevent the data transmission from being transmitted to a second layer of the computer landscape, wherein the second layer of the computer landscape comprises an application layer;
in response to determining that the data transmission is authenticated by the client certificate authentication, transmit the data transmission to the second layer of the computer landscape;
in response to receiving the data transmission at the second layer from the first layer, verify the user-based authentication at the second layer;
in response to determining at the second layer that the data transmission cannot be authenticated by the user-based authentication, prevent the data transmission from being processed at the second layer; and
in response to determining at the second layer that the data transmission is authenticated by the user-based authentication, process the data transmission at the second layer;
wherein the processing the data at the second layer comprises sending an acknowledgment from the first computer processor to the second computer processor acknowledging that the first computer processor has received the data transmission;
wherein the first computer processor transmits the payment instruction transmission to a third computer processor for processing by the third computer processor; and
wherein the computer landscape comprises a multi-layer network.

2. The system of claim 1, wherein the client certificate authentication comprises an authentication for a particular client, the particular client comprising a plurality of users.

3. The system of claim 2, wherein the particular client comprises a business organization.

4. The system of claim 1, wherein the client certificate authentication comprises a client certificate that was previously electronically signed by a party receiving the data transmission.

5. The system of claim 1, wherein the user-based authentication comprises an authentication for a particular individual user, and wherein the particular individual user is associated with a particular client.

6. The system of claim 1, wherein the user-based authentication comprises a user-name and password.

7. The system of claim 1, wherein the data transmission network comprises an Internet-based service.

8. A process comprising:
    receiving into a computer landscape a data transmission from a data transmission network, wherein the data transmission comprises a client certificate authentication and a user-based authentication;
    verifying, at a first layer of the computer landscape, the client certificate authentication, wherein the first layer of the computer landscape comprises a network layer;
    in response to determining at the first layer that the data transmission cannot be authenticated by the client certificate authentication, preventing the data transmission from being transmitted to a second layer of the computer landscape, thereby reducing network traffic that enters into the application layer, wherein the second layer of the computer landscape comprises an application layer;
    in response to determining that the data transmission is authenticated by the client certificate authentication, transmitting the data transmission to the second layer of the computer landscape;
    in response to receiving the data transmission at the second layer from the first layer, verifying the user-based authentication at the second layer;
    in response to determining at the second layer that the data transmission cannot be authenticated by the user-based authentication, preventing the data transmission from being processed at the second layer; and
        in response to determining at the second layer that the data transmission is authenticated by the user-based authentication, processing the data transmission at the second layer;
        wherein the processing the data at the second layer comprises sending an acknowledgment from the first computer processor to the second computer processor acknowledging that the first computer processor has received the data transmission;
        wherein the first computer processor transmits the payment instruction transmission to a third computer processor for processing by the third computer processor; and
        wherein the computer landscape comprises a multi-layer network.

9. The process of claim 8, wherein the client-based authentication comprises a client certificate that was previously electronically signed by a party receiving the data transmission.

10. A computer readable storage device comprising instructions that when executed by a processor execute a process comprising:
    receiving into a computer landscape a data transmission from a data transmission network, wherein the data transmission comprises a client certificate authentication and a user-based authentication;
    verifying, at a first layer of the computer landscape, the client certificate authentication, wherein the first layer of the computer landscape comprises a network layer;
    in response to determining at the first layer that the data transmission cannot be authenticated by the client certificate authentication, preventing the data transmission from being transmitted to a second layer of the computer landscape, wherein the second layer of the computer landscape comprises an application layer;
    in response to determining that the data transmission is authenticated by the client certificate authentication, transmitting the data transmission to the second layer of the computer landscape;
    in response to receiving the data transmission at the second layer from the first layer, verifying the user-based authentication at the second layer;
    in response to determining at the second layer that the data transmission cannot be authenticated by the user-based authentication, preventing the data transmission from being processed at the second layer; and
    in response to determining at the second layer that the data transmission is authenticated by the user-based authentication, processing the data transmission at the second layer;
    wherein the processing the data at the second layer comprises sending an acknowledgment from a first computer processor to a second computer processor acknowledging that the first computer processor has received the data transmission;
    wherein the first computer processor transmits the payment instruction transmission to a third computer processor for processing by the third computer processor; and
    wherein the computer landscape comprises a multi-layer network.

* * * * *